(12) United States Patent
Zhang et al.

(10) Patent No.: US 9,597,802 B2
(45) Date of Patent: Mar. 21, 2017

(54) METHOD AND SYSTEM FOR ROBOTIC ASSEMBLY PARAMETER OPTIMIZATION

(71) Applicants: George Zhang, Windsor, CT (US); Hui Zhang, Shanghai (CN); Jianmin He, Bellevue, WA (US); Jianjun Wang, West Hartford, CT (US)

(72) Inventors: George Zhang, Windsor, CT (US); Hui Zhang, Shanghai (CN); Jianmin He, Bellevue, WA (US); Jianjun Wang, West Hartford, CT (US)

(73) Assignee: ABB Inc., Cary, NC (US)

( * ) Notice: Subject to any disclaimer, the term of this patent is extended or adjusted under 35 U.S.C. 154(b) by 0 days.

(21) Appl. No.: 14/638,179

(22) Filed: Mar. 4, 2015

(65) Prior Publication Data

US 2015/0217453 A1    Aug. 6, 2015

Related U.S. Application Data

(62) Division of application No. 12/522,257, filed on Apr. 20, 2010, now Pat. No. 9,008,836.

(51) Int. Cl.
*G06F 19/00* (2011.01)
*B25J 9/16* (2006.01)
*G06F 17/18* (2006.01)

(52) U.S. Cl.
CPC ............ *B25J 9/1687* (2013.01); *G06F 17/18* (2013.01); *G05B 2219/40032* (2013.01); *Y10S 901/02* (2013.01); *Y10S 901/03* (2013.01); *Y10S 901/41* (2013.01)

(58) Field of Classification Search
USPC .................................. 700/245–264
See application file for complete search history.

(56) References Cited

U.S. PATENT DOCUMENTS

2002/0056181 A1   5/2002   Sakakibara et al.
2005/0113971 A1   5/2005   Zhang et al.

OTHER PUBLICATIONS

Rout et al. "Tolerance design of robot parameters using Taguchi method" Nov. 1, 2006, Mechanical Systems and Signal Processing, London, GB, pp. 1832-1852, XP005597330, ISSN: 0888-3270.
Authorized Officer Emilie Sportellini, European Patent Office, PCT Notification of Transmittal of the International Search Report and the Written Opinion of the International Searching Authority, or the Declaration, having a mailing date of Jun. 27, 2008 in International Application No. PCT/US2008/000189 (inventors Zhang et al.).

*Primary Examiner* — Bhavesh V Amin
(74) *Attorney, Agent, or Firm* — Taft Stettinius & Hollister LLP (57) ABSTRACT

A method and system to optimize the parameters of a robot used in an assembly process. The assembly process is categorized based on its nature which may be cylindrical, radial and multi-stage insertion. The search pattern and search parameters are specified. The parameters are optimized and the optimized parameter set are verified and when a predetermined criteria such as assembly cycle time set and/or success rate is met the optimization process stops. When the optimization stops the verified parameters are used to cause the robot to perform the categorized assembly process. If the parameters do not meet the predetermined criteria, another round of optimization using the same or other parameters can be performed.

19 Claims, 11 Drawing Sheets

METHOD AND SYSTEM FOR ROBOTIC ASSEMBLY PARAMETER OPTIMIZATION

CROSS REFERENCE TO RELATED APPLICATION

This application claims the priority of U.S. provisional patent application Ser. No. 60/879,483 filed on Jan. 9, 2007, entitled "Method And System For Robotic Assembly Parameter Optimization" the contents of which are relied upon and incorporated herein by reference in their entirety, and the benefit of priority under 35 U.S.C. 119(e) is hereby claimed.

1. FIELD OF THE INVENTION

This invention relates to a robotic assembly process and optimization of the parameters of the robot.

2. DESCRIPTION OF THE PRIOR ART

Industrial robots with force control are used more and more in assembly applications in both the automotive and general industries. U.S. Patent Application Publication No. 2002056181 ("the '181 Published Application") and U.S. Patent Application Publication No. 2005113971 ("the '971 Published Application") both describe the use of an industrial robot with force control to perform tight-tolerance assembly tasks that cannot be performed by a conventional industrial robot with position control.

As is described in the '181 Published Application and with reference to FIGS. 3a to 3d therein, a robot after being positioned at an approach start position for fitting a fitting part into a receiving part starts an approach operation to the received part under speed and force control. When the fitting part comes in contact with the receiving part and a reaction force thereof exceeds a threshold value set by parameter, it is determined that the fitting part comes in contact with the receiving part, and the procedure proceeds to a fitting operation. In the fitting operation, the fitting part is moved under speed and force control in accordance with the inserting/fitting direction. If the fitting operation does not progress for some reason and the movement stops in the middle of the fitting the fitting part is moved in a direction opposite to the inserting direction up to the approach start position under the speed and force control in accordance with the speed and the target force for the fitting operation to thereby draw the fitting part from the receiving part. FIGS. 4a to 4c show the drawing of a fitted part from a receiving part. The set speed for the removal of the fitted part from the receiving part is under force control.

As is described in the '971 Published Application, an attraction force vector is superimposed on the force measured by a force sensor on the robot as a fitting part is moved toward a receiving part. The force vector can also be a repulsive force vector. After the robot end effector attracts contact with the surface on which the receiving part is located the force/torque values are converted into a velocity command value and parameters are designed for stable and gentle contact of the end effector with the surface to thereby minimize the contact force of the fitting part with the surface. A search velocity pattern in a plane parallel to the surface by the controller on the velocity command to the robot when the fitting part is in contact with the surface and the location of the receiving part is not known to the robot controller.

However, since the introduction of force control, in which the actual robot path depends not only on the programmed position but also on the interaction force between the assembled parts/components, the process of programming the robot has become more difficult. The optimal set of robotic (force control) parameters is often obtained either by trial and error or offline analysis tools. This parameter selection process is tedious and time consuming.

SUMMARY OF THE INVENTION

A system for assembling components comprising:
an industrial robot for assembling the components;
a computing device in communication with the robot, the computing device having therein program code usable by the computing device for optimizing the parameters of controlling a robot to fit a fitting part into a receiving part, the code comprising:
code configure to categorize independent of a size of the fitting part and a size of the receiving part an assembly process for the robot to fit the fitting part into the receiving part as one of a plurality of predetermined types of the assembly processes;
code configured to specify from the categorized assembly process a search pattern for fitting the fitting part into the receiving part and parameters for the categorized assembly process;
code configured to obtain by using a predetermined technique a set of optimal parameters for the categorized assembly process;
code configured to verify that the set of optimal parameters meets a predetermined criteria to become the optimal parameters for controlling the robot to perform the search pattern specified from the categorized assembly process; and
code configure to control the robot to perform the specified search pattern using the verified optimal parameters for the categorized assembly process to create an assembly that is a combination of the fitting and receiving parts.

A system for assembling components comprising:
an industrial robot for assembling the components;
a computing device in communication with the robot, the computing device having therein program code usable by the computing device for optimizing the parameters of controlling a robot to fit a fitting part into a receiving part, the code comprising:
code configured to categorize from a plurality of predetermined types of assembly processes independent of a size of the fitting part and a size of a receiving part an assembly process for the robot to fit the fitting part into the receiving part to create an assembly that is a combination of the fitting and receiving parts;
code configured to specify from the categorized assembly process a search pattern for the categorized assembly process and parameters for the categorized assembly process for fitting the fitting part into the receiving part to create the assembly that is the combination of the fitting and receiving parts;
code configured to obtain by using a predetermined technique a set of optimal parameters for the categorized assembly process;
code configured to verify that the set of optimal parameters meets a predetermined criteria to become the optimal parameters for controlling the robot to perform the search pattern specified from the categorized assembly process; and
code configured to control the robot to perform the specified search pattern for fitting the fitting part into the receiving part to create the assembly that is the combination of the fitting and receiving parts using the verified optimal parameters for the categorized assembly process.

A system for assembling components comprising:
an industrial robot for assembling the components;
a computing device in communication with the robot, the computing device having therein program code usable by the computing device for optimizing the parameters of controlling a robot to fit a fitting part into a receiving part, the code comprising:
code configured to categorize based on a characteristic of the fitting part and the receiving part other than a size of the fitting part and a size of the receiving part an assembly process for the robot to fit the fitting part into the receiving part as one of a plurality of predetermined types of the assembly processes;
code configured to specify from the categorized assembly process a search pattern for fitting the fitting part into the receiving part and parameters for the categorized assembly process;
code configured to obtain by using a predetermined technique a set of optimal parameters for the categorized assembly process;
code configured to verify that the set of optimal parameters meets a predetermined criteria to become the optimal parameters for controlling the robot to perform the search pattern specified from the categorized assembly process; and
code configured to control the robot to perform the specified search pattern using the verified optimal parameters for the categorized assembly process to create an assembly that is a combination of the fitting and receiving parts.

DETAILED DESCRIPTION

Figure 1:
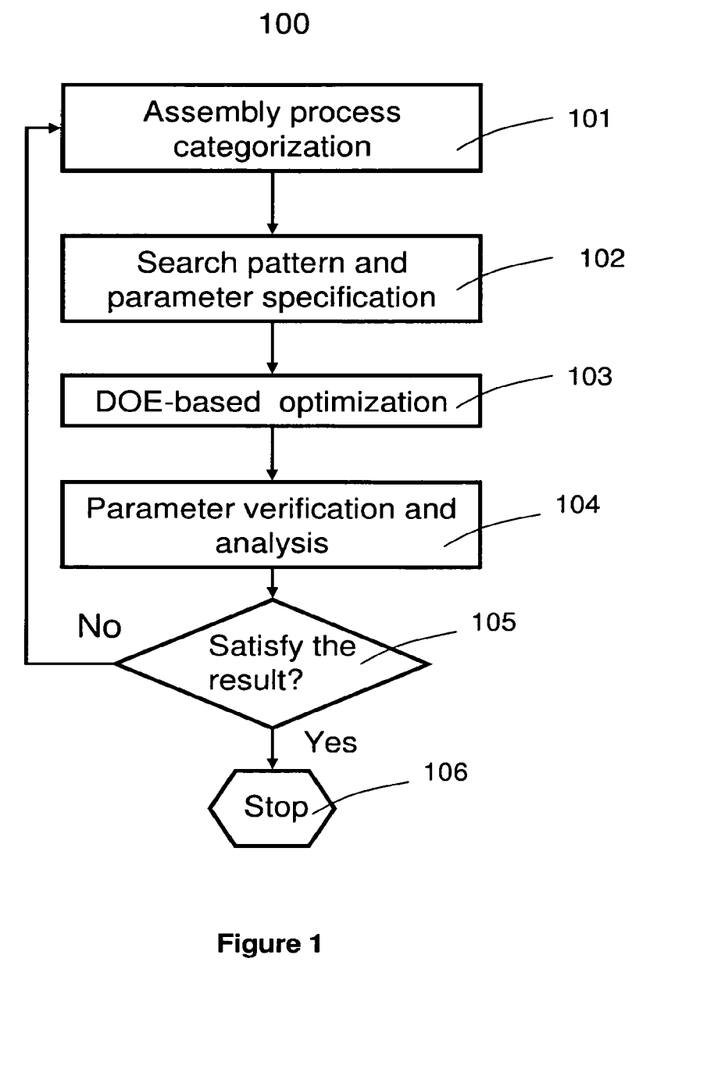
FIG. 1 shows a flowchart for the robot assembly parameter optimization method of the present invention.

Referring now to FIG. 1, there is shown a flowchart 100 for the method of the present invention for robotic assembly parameter optimization. The flowchart 100 has four action steps 101-104, each of which are described in more detail below, and a decision step 105. The first step 101 in the method is the assembly process categorization. The second step 102 is the search pattern and search parameter specification. The third step 103 is the Design Of Experiment (DOE) based optimization and the fourth step 104 is that of parameter set verification. If in step 105 the result is satisfied, such as the assembly cycle time and/or success rate meet the required values, the process stops at 106 otherwise another round of optimization may be performed. While FIG. 1 shows in step 103 a DOE based optimization and DOE based optimization is described hereinafter, it should be appreciated that DOE is only one example of an optimization type that can be used in the present invention. Therefore the description of DOE herein should not be used to limit the scope of the present invention.

In order to clearly describe the invention in detail, the following four subsections are included: 1) description of the assembly process categorization method; 2) description of the search pattern and parameter specification method; 3) description of the DOE-based parameter optimization method and system; 4) description of the result satisfaction criteria and second round optimization strategy; along with 5) a description of on-pendant parameter setup and optimization method and graphical user interface.

1) Description of the Robotic Assembly Process Categorization

Figure 2:
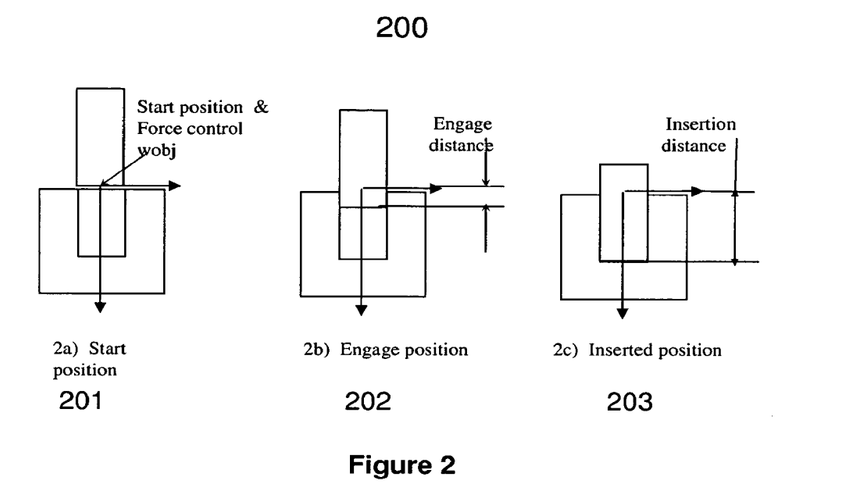
FIG. 2 illustrates an insertion process.

Robotic assembly processes are categorized based on their nature into cylindrical, radial and multi-stage insertion/assembly. As illustrated in FIGS. 2a to 2c, cylindrical insertion includes assembly applications with a cylinder and a smooth bore, such as transmission valve body assembly and piston stuffing. More specifically, FIG. 2a shows the start position of the assembly where the edge of cylinder 202 to be first inserted into smooth bore 204, hereinafter the leading edge, is positioned just above the opening of the bore 204. The assembly application proceeds to the engage position shown in FIG. 2b where the leading edge of cylinder 202 is inserted part way into the bore 204. The assembly application is finished when as is shown in FIG. 2c the leading edge of cylinder 202 is in the inserted position in smooth bore 204.

Figure 3:
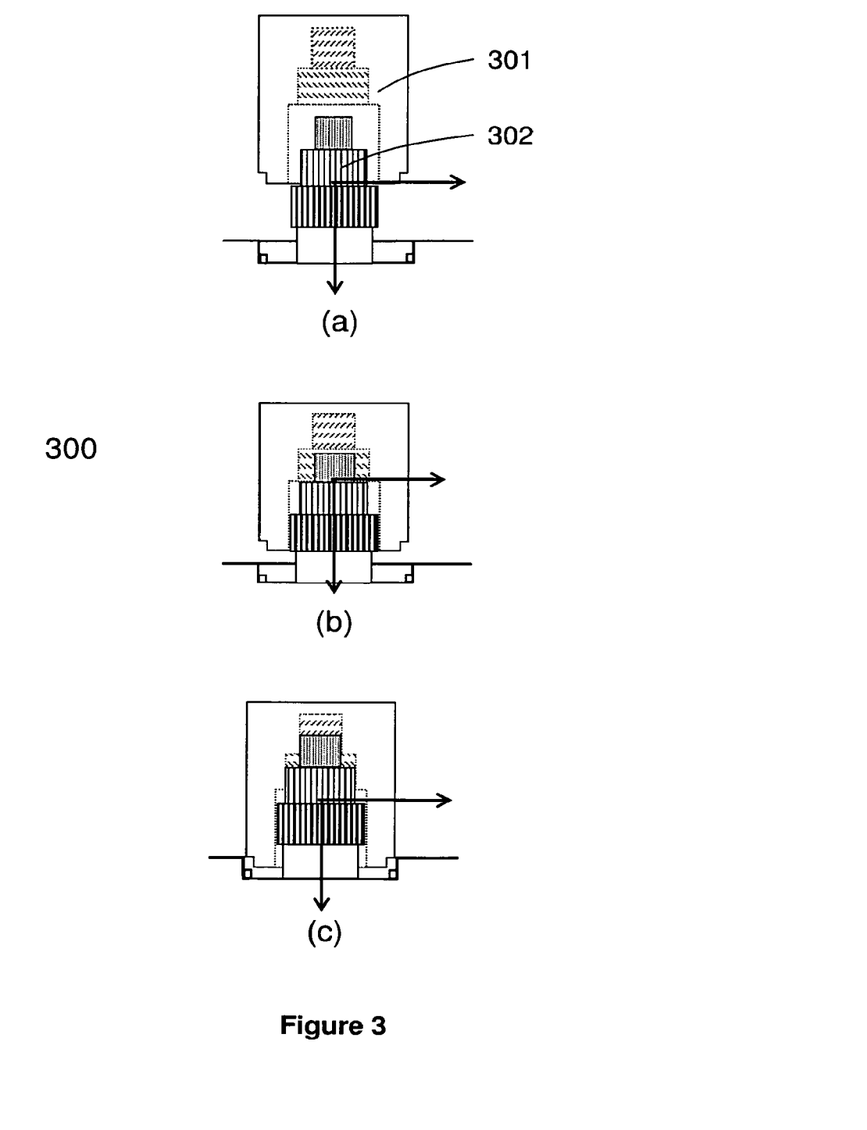
FIG. 3 illustrates the assembly of a torque converter as an example of a radial assembly process.

Radial insertion, which is not shown, includes assembly applications with a "toothed", "splined" or "gear" mesh, such as a forward clutch assembly and spline gear assembly. Multi-stage insertion, which can require any combination of cylindrical and radial insertions, includes assembly applications such as the assembly of a torque converter assembly 300 illustrated in FIGS. 3a to 3c and half shaft assembly (not shown). The component 301 in FIG. 3 illustrates the assembly contact part of the torque converter that is held by the robot. The component 301 has gear teeth shown by the wavy lines which are to be mated to the teeth shown by the straight lines in the component 302 of the transmission shaft that is not held by the robot. FIG. 3a shows the relation between the assembled parts at starting time; FIG. 3b shows that the first gear set which is the largest in component 301 is engaged with the teeth in component 302; and FIG. 3c shows that the second gear set is engaged with those teeth.

The cylindrical, radial and multi-stage insertion types can cover most of the real-world assembly applications. Additional insertion types can be defined if there is an assembly process that can not be described by the above types. For each insertion/assembly type, a certain search pattern is applied to perform the assembly process. There are robot force control parameters that are related to each search pattern. The next section describes the search pattern and specification of the related robot force control parameters.

2) Description of Search Pattern and Robot Parameter Specification

Figure 4:
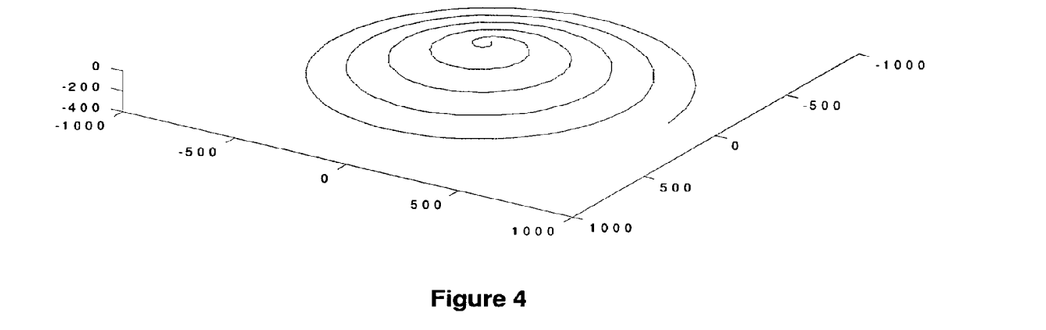
FIG. 4 shows the spiral searching pattern for cylindrical insertion.

It has been found that the type of assembly defines the assembly search pattern. In other words, different insertion types need different search patterns to accomplish the job. For example, in cylindrical insertion, a spiral searching pattern 400, one example of which is shown in FIG. 4, is identified as the major search pattern along with circular, rotation and Z-direction hopping patterns. The final force control search path is determined by the combination of all of the search patterns with their parameters. In radial insertion, the Z-direction rotation is the dominant search pattern along with the circular and Z-direction hopping pattern. In multi-stage insertion, search patterns used in radial insertion are applied for each of the multi stages. Besides the search pattern, the transition state between the search patterns and the combination of the patterns are also defined. All of those functions are represented by robotic assembly parameters.

There are two sets of assembly parameters in the system of the present invention. One set, called Set Parameter, is related to the search pattern transition, process action and insertion termination and is normally setup at the beginning of the robotic assembly engineering process. The Set Parameters are:

Insertion Distance—the distance between the insertion starting position and the end position (see FIG. 2c)

Engage Distance—the distance between the insertion starting position to the position where the parts are engaged (see FIG. 2b)

Figure 5:
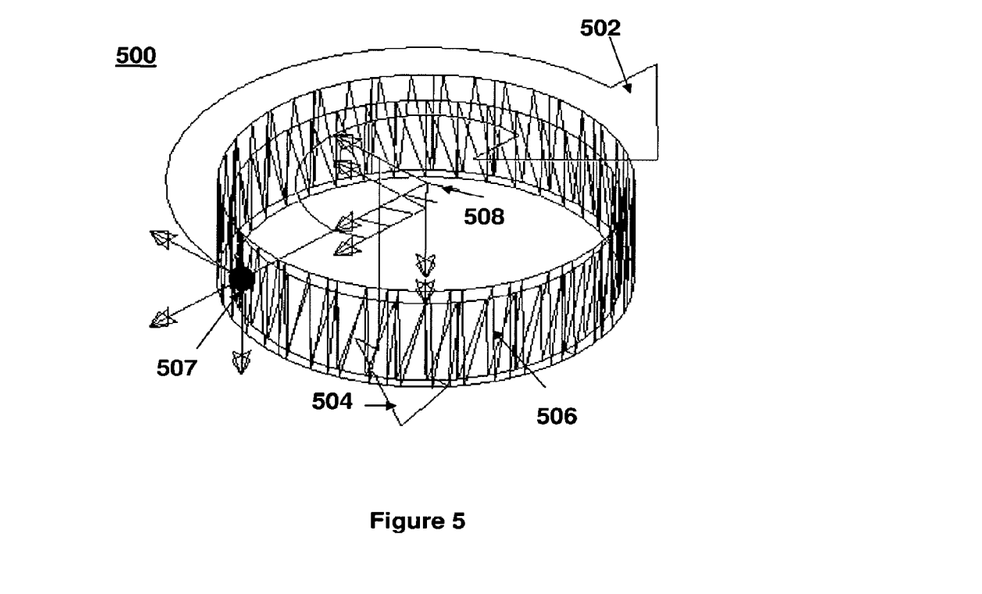
FIG. 5 shows the combined search path for a radial type insertion.

Time Limit—time limitation before a search process is terminated or re-performed Max Num Try—maximum number of trials before an unsuccessful insertion is claimed Use Timeout Act—a flag that signals whether or not to use a customer specified timeout handling method TO Action Num—timeout handling routine number Use Force Cond—a flag that signals whether or not to use force control insertion termination Cond Force Value—condition force value used in force control insertion termination Use IO Action—a flag that signals whether or not IO action is used at end of the insertion IO Action Num—the IO number used in the action above Use Force Retreat—a flag that signals whether or not the force control retreat is used Retreat Force—the force value used in the force control retreat Another set of the parameters, called Tune Parameters, are more related to the performance tuning of the robotic assembly process. Tune parameters are insertion/assembly type related and the initial values are setup at the beginning of the robotic assembly process. For a cylindrical insertion type, the parameters can be but are not limited to the following:

Search force—Max value of the searching/insertion force used in the tool Z direction Spring Const—spring constant for the spring force used in the insertion Spiral Speed—spiral searching speed in the X-Y plane of the tool frame Spiral Radius—the maximum radius in which the spiral search is performed Spiral Turn—the turn number in which the spiral search motion reaches its maximum radius Circular Speed—the circular searching speed in the X-Y plane of the tool frame Circular radius—the circular radius used in the insertion corresponding to the circular speed above Force Amp—the amplitude of the hopping force in the Z direction of the tool frame Force Period—the period of the hopping (oscillation) force For radial type insertion, the tune parameters are:

Search force—Max value of the searching/insertion force used in the tool Z direction Rotation Speed—the rotation speed used in the insertion around the tool Z axis Rotation Angle—the maximum angle value used in the above rotation motion Circular Speed—the circular searching speed in the X-Y plane of the tool frame Circular Radius—the circular radius used in the insertion corresponding to the circular speed above Force Amp—the amplitude of the hopping force in the Z direction of tool frame Force Period the period of the hopping (oscillation) force The combination of the above parameterized force reference and the assembly contact force define the actual assembly path. An example of the radial type insertion reference path, that is the ideal path for radial insertion, is shown in FIG. 5. Reference path 500 has both a rotational component shown by the arrow 502 and an up and down components shown by the arrow 504. The zigzag lines 506 in FIG. 5 show the final path. Reference numeral 508 designates the center for the coordinate system and numeral 507 designates the robot tool center point that moves.

3) Description of the DOE-Based Parameter Optimization Method

DOE (Design Of Experiments) is a method that is used to find a set of optimal parameters symmetrically. *Design of Experiments for Engineers and Scientists*, Jiju Antony, Elsevier Butterworth-Heinemann, 2003 and *Design and Analysis of Experiments, Sixth Edition*, Douglas C. Montgomery, John Wiley & Son, Inc. 2005 introduces the basic DOE concept and analysis method and describes the formulation and calculation details for the DOE method.

Figure 6:
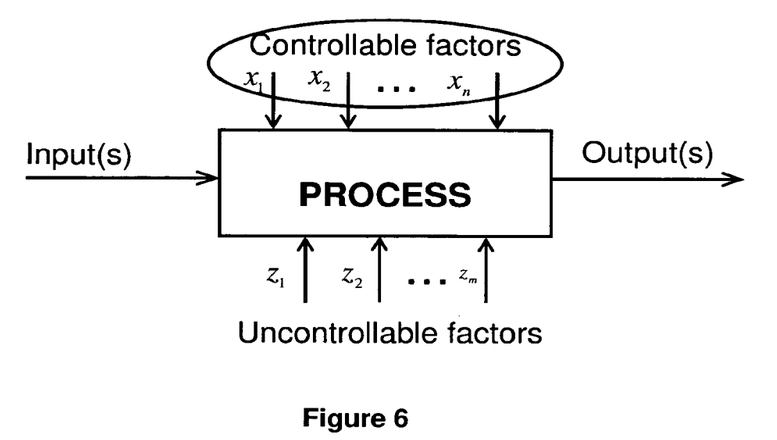
FIG. 6 shows an example of a DOE process analysis diagram.

As illustrated in FIG. 6, for a particular process, which can be any one of the processes described above, the controllable variables such as production batch are defined, the uncontrollable variables are ignored, the inputs are varied in a designed manner, and the output characteristics are measured. Normally, a fractional factorial test is used to find the most influential parameters first and then full factorial tests are used to result in a set of optimized parameters. In this robotic assembly parameter optimization, for example in the radial insertion type, the input parameters are Search Force, Rotation Speed, Rotation Angle, Circular Speed, Circular Angle, Force Amp and Force Period. The output variable is Assembly Time.

An experiment was performed using the method and system of the present invention. The data obtained from performing the experiment was analyzed using the DOE Analysis of Variance (ANOVA) method. A short description of the ANOVA method is given below along with the various screen shots, also described below, of a graphic user interface used in the experimental setup. The PB screening method, also described below, is first employed to identify the most influential of the input parameters.

Figure 13:
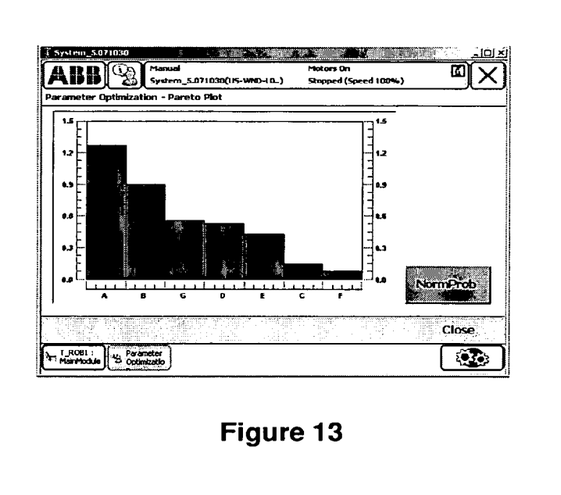
FIG. 13 shows the GUI for the Pareto plot page.

A Pareto plot named after the Italian scientist Vilfredo Pareto, shown in FIG. 13, is used to show visually the influence of the input Tune Parameters. The Pareto plot is a way to present statistical data. The plot allows the detection of the factor and interaction effects that are most important to the process or design optimization study.

Figure 15:
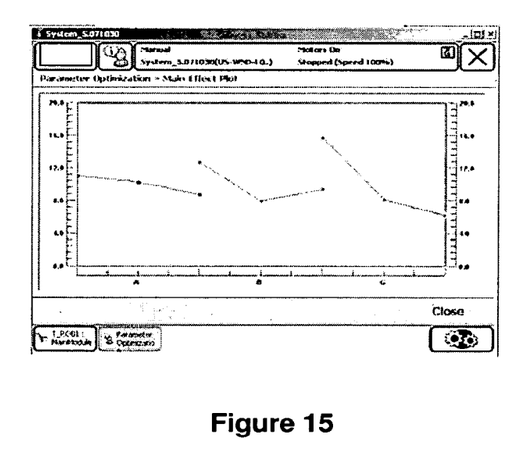
FIG. 15 shows the GUI for the main effect plot page.
Figure 17:
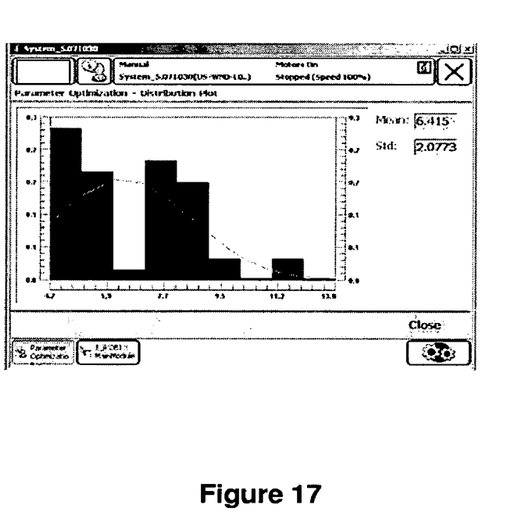
FIG. 17 shows the GUI for the assembly time distribution plot page.

In the plot, A is the Search Force, B is the Rotation Speed, G is the Force Period, D is the Circular Speed, E is the Circular Radius, C is the Rotation Angle and F is the Force Amplitude. As is shown in FIG. 13, the three most influential input parameters are the A, B and G parameters. A full factorial test is used for optimizing the three most influential parameters. The main effect plot of FIG. 15 shows the trend of each of the three parameters A, B and G. Finally, experiments are run for the optimized parameter set repeatedly to find the statistical property of the assembly performance. If multiple trials are run to minimize the variation that is introduced by the manufacturing process in parameter screening, mean value of the assembly time is used in the analysis; and in parameter optimization, both mean value and mean value plus 3-sigma is used in the analysis to consider the effect of the variation. In addition, the success rate is calculated for each of all sets of the parameters. In the verification analysis, the assembly cycle time distribution is calculated and plotted as is shown in FIG. 17.

Analysis of Variance (ANOVA)

Figure 7:
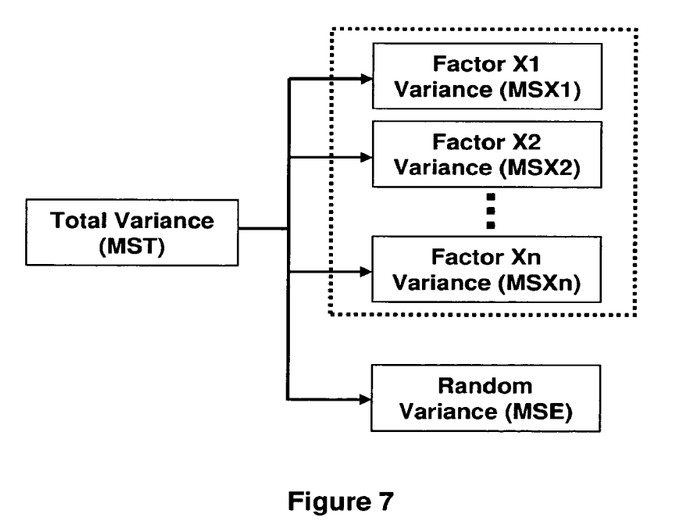
FIG. 7 shows an example of a DOE Analysis of variance diagram.

FIG. 7 shows a DOE analysis of variance diagram. The total variance (MST) is the combination of the variances, MSX1 to MSXn respectively, of the factors X1 to Xn shown in the dotted line in FIG. 7 and the random variance (MSE).

Suppose there are $\alpha$ levels of a single factor that are to be compared. The observed response from each of the $\alpha$ levels is a random variable. The data would be $y_{ij}$, representing the jth observation taken under factor level i. There will be, in general, n observations. Then:

$$y_{ij} = \mu + \tau_i + \varepsilon_{ij} \begin{cases} i = 1, 2, \ldots, \alpha \\ j = 1, 2, \ldots, n \end{cases} \quad (3\text{-}1)$$

In this equation 3-1, $\mu$ is a parameter common to all levels called the overall mean, and $\tau_i$ is a parameter unique to the ith level called ith level effect. $\varepsilon_{ij}$ is a random error component that incorporates all other source of variability in the experiment.

Equation 3-1 is called the single-factor analysis of variance (ANOVA). If the design of the experiment is a completely randomized design, the objectives are to test appreciate hypotheses about the treatment means and to estimate them. For hypotheses testing, the model errors are assumed to be normally and independently distributed random variables with mean and zero and variance $\sigma^2$. The variance $\sigma^2$ is assumed to be constant for all levels of the factor. This implies the observations $$y_{ij} \sim N(\mu + \tau_i, \sigma^2) \quad (3\text{-}2)$$

and that the observations are mutually independent.

PB Screening Designs and Pareto Plot

P-B designs are named after their inventors R. L. Packett and J. P. Burman. These designs are based on Hadamard matrices in which the number of experiment runs is a multiple of four (4) i.e. N=4, 8, 12, 16 . . . and so on, where N is the number of runs. The purpose of screening designs is to identify and separate out those factors that demand further investigation. The Pareto plot, one example of which is shown in the previously described FIG. 13, is as is shown in that figure a way to present statistical data.

Normal Distribution, Mean and Variance

Normal distribution is the most important sampling distribution. If variable y is a normal random variable, its probability distribution will be a normal distribution.

$$f(y) = \frac{1}{\sigma\sqrt{2\pi}} e^{-(1/2)[(y-\mu)/\sigma]^2} \quad (3\text{-}3)$$

where $-\infty < \mu < +\infty$ is the mean of the distribution and $\sigma^2 > 0$ is the variance.

4) Description of the Result Satisfaction Criteria and Optimization Strategy

Figure 14:
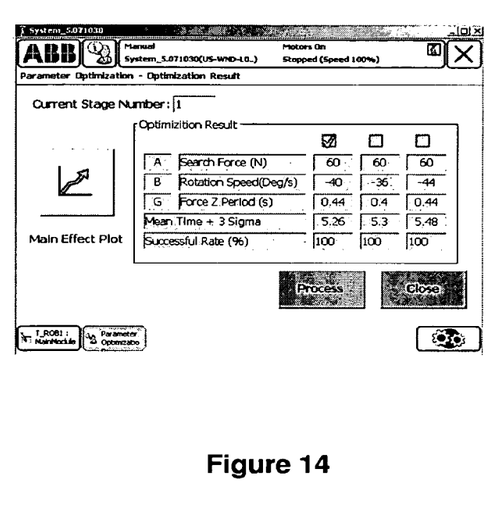
FIG. 14 shows the GUI for the optimization result page.
Figure 16:
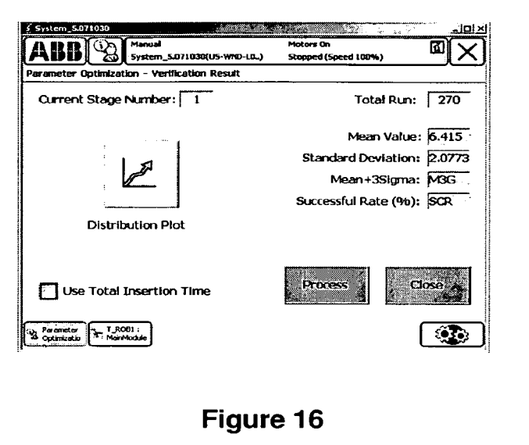
FIG. 16 shows the GUI for the verification result page.

In the most influential parameter screening test, all parameters (for example the seven shown in FIG. 11 for radial type insertion) are screened. As is described above, the results of the screening are shown in the Pareto plot of FIG. 13. If multiple trials are conducted for the same test, the mean value is used in the screening analysis. Interactions among the parameters are not considered. Real-world applications showed that this assumption is valid for most of the assembly applications. In parameter optimization, the one (1) to three (3) most influential parameters and two (2) to five (5) levels, that is, amplitudes for the parameters were used. FIG. 14 shows one example of the parameter optimization in which the three most influential input parameters A, B and G identified in the Pareto plot of FIG. 13 are used with three levels. The main effect plot of FIG. 15 shows the trend of each of the three parameters. FIG. 16 shows the results of the verification and FIG. 17 shows for the verification results a plot of the assembly time distribution. If the overall result is not satisfied, then as is shown in the flowchart 100 of FIG. 1 other parameters can be used for the next round of optimization until the assembly cycle time goal is reached. If multiple trials are conducted for the same parameter set, both mean value and mean plus 3-Sigma as well as the success rate are considered in the optimal parameter set searching.

5) Description of the on-Pendant Parameter Setup and Optimization and Graphical User Interface.

Figure 18:
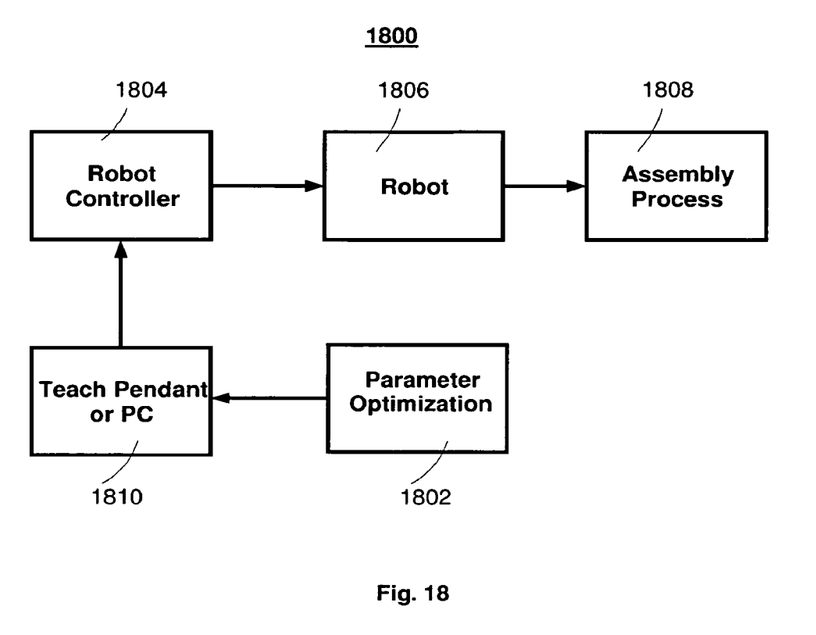
FIG. 18 shows a system which may be used to implement the present invention.

FIG. 18 shows a system that can be used to implement the present invention. While all robotic assembly parameters including resulting assembly cycle time are stored in and testing runs are performed by a robot controller such as controller 1804 of FIG. 18, the parameter optimization process is performed on the teach pendant 1810 of FIG. 18 in order to improve the time performance. A software routine is written to be executed in a micro processor in the robot teach pendant 1810.

Figure 8:
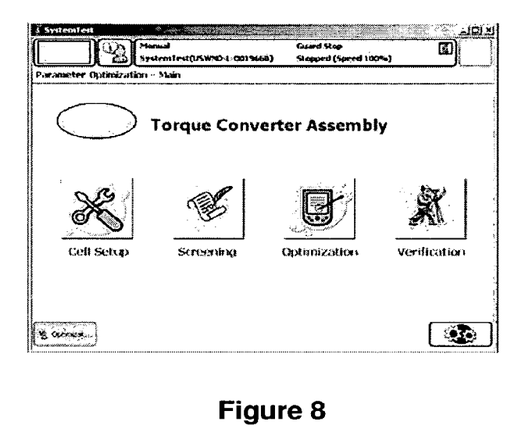
FIG. 8 shows the graphical user interface (GUI) for the main page of a computer program is one embodiment of the present invention.
Figure 9:
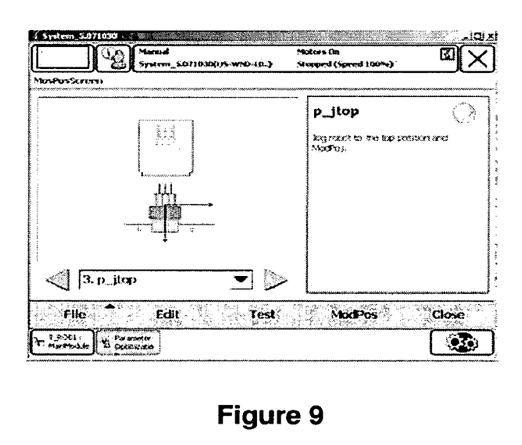
FIG. 9 shows the GUI for the position setup page.
Figure 10:
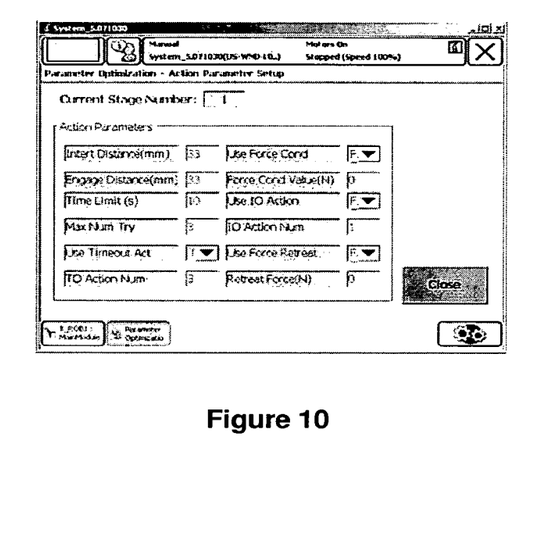
FIG. 10 shows the GUI for the set parameter page.
Figure 11:
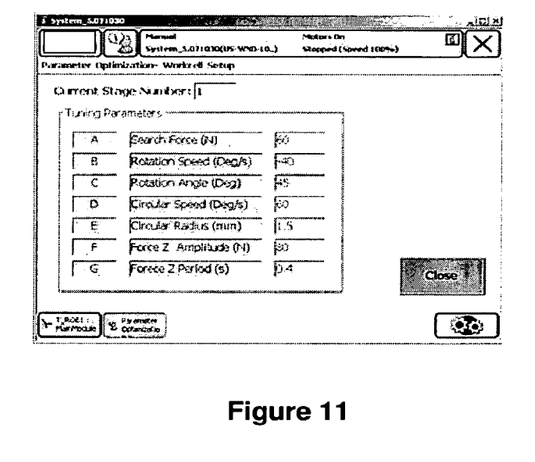
FIG. 11 shows the GUI for the tune parameter page.
Figure 12:
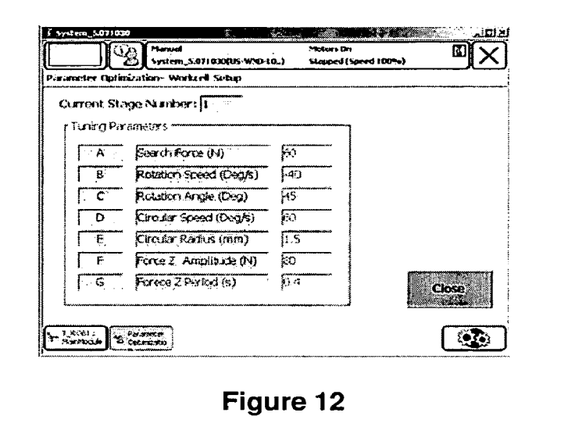
FIG. 12 shows the GUI for the screening result page.

In addition, a graphic user interface (GUI) is developed to handle the testing variable setup, program execution, data analysis and result display. FIG. 8 shows a main page of the user interface; FIG. 9 shows the robot position setup page; FIGS. 10 and 11 illustrate the set and tune parameter setup pages. FIGS. 12 and 13 display the screening setup and result. FIGS. 14 and 15 display the optimization setup and result, and FIGS. 16 and 17 describe the parameter verification setup and result.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++, C# or the like, or may also be written in conventional procedural programming languages, such as the "C" programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Referring now to FIG. 18, there is shown a system 1800 which may be used to implement the present invention. The system 1800 includes the method 1802 of FIG. 18 and 100 of FIG. 1 which may be resident, as described above, on a suitable media in a form that can be loaded into the robot controller 1804 for execution. Alternatively, the method can be loaded into the controller 1804 or may be downloaded into the controller 1804, as described above, by well known means from the same site where controller 1804 is located or at another site that is remote from the site where controller 1804 is located. As another alternative, the method 1802 may be resident in controller 1804 or the method 1802 may installed or loaded into a computing device, such as the teach pendant 1810 that as described above has a microprocessor or a PC, which is connected to controller 1804 to send commands to the controller 1804. The GUI described above would then be resident on the teach pendant 1810 or on the PC.

As can be appreciated by those of ordinary skill in the art, when the method is in controller 1804, the controller functions as a computing device to execute the method 1802. The controller 1804 is connected to robot 1806 which in turn is used to perform the assembly process 1808. Thus if the method 1802 is executed by controller 1804 or if the controller 1804 receives commands from a computing device such as teach pendant 1810 that executes the method 1802, the robot 1806 is controlled to perform the assembly process 1808 in accordance with the present invention. It should be appreciated that the method 1802 can be implemented on the robot controller 1804 as a software product, or implemented partly or entirely on a remote computer, which communicates with the robot controller 1804 via a communication network, such as, but not limited to, the Internet.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for assembling components comprising:
  an industrial robot for assembling said components;
  a computing device in communication with said robot, said computing device having therein program code usable by said computing device for optimizing the parameters of controlling a robot to fit a fitting part into a receiving part, said code comprising:
  code configured to categorize independent of a size of said fitting part and a size of said receiving part an assembly process for said robot to fit said fitting part into said receiving part as one of a plurality of predetermined types of said assembly processes;
  code configured to specify from said categorized assembly process a search pattern for fitting said fitting part into said receiving part and parameters for said categorized assembly process;
  code configured to obtain by using a predetermined technique a set of optimal parameters for said categorized assembly process;
  code configured to verify that said set of optimal parameters meets a predetermined criteria to become the optimal parameters for controlling said robot to perform said search pattern specified from said categorized assembly process; and
  code configured to control said robot to perform said specified search pattern using said verified optimal parameters for said categorized assembly process to create an assembly that is a combination of said fitting and receiving parts.

2. The system method of claim 1 further comprising selecting said categorized assembly process from said predetermined types of assembly processes comprising cylindrical, radial and multi-stage insertion assembly processes.

3. The system of claim 1 further comprising assembling said specified search pattern from a plurality of search patterns with a transition state between each of said plurality of patterns and said parameters specified for said categorized assembly process comprises a set of parameters related to said search pattern transitions and another set of parameters related to the performance of said categorized assembly process.

4. The system of claim 2 wherein said multi-stage insertion assembly process is a combination of one or more cylindrical assembly processes and one or more radial assembly processes.

5. The system of claim 2 wherein in said cylindrical assembly process said fitting part is cylindrical and said receiving part is a smooth bore.

6. The system of claim 2 wherein said radial assembly process includes assembly applications with a toothed, splined or gear mesh.

7. The system of claim 1 wherein said fitting part and said receiving part each have a predetermined structure and said code further comprises code configured to categorize said assembly process based on said fitting part predetermined structure and said receiving part predetermined structure.

8. The system of claim 1 wherein said assembly process for said robot to fit said fitting part into said receiving part is one or more of said plurality of predetermined types of said assembly processes and said code further comprises code configured to categorize based on said fitting part predetermined structure and said receiving part predetermined structure which of said one or more of said plurality of assembly processes are to be used by said robot to fit said fitting part into said receiving part.

9. A system for assembling components comprising:
an industrial robot for assembling said components;
a computing device in communication with said robot, said computing device having therein program code usable by said computing device for optimizing the parameters of controlling a robot to fit a fitting part into a receiving part, said code comprising:
coded configured to categorize from a plurality of predetermined types of assembly processes independent of a size of said fitting part and a size of a receiving part an assembly process for said robot to fit said fitting part into said receiving part to create an assembly that is a combination of said fitting and receiving parts;
code configured to specify from said categorized assembly process a search pattern for said categorized assembly process and parameters for said categorized assembly process for fitting said fitting part into said receiving part to create said assembly that is said combination of said fitting and receiving parts;
code configured to obtain by using a predetermined technique a set of optimal parameters for said categorized assembly process;
code configured to verify that said set of optimal parameters meets a predetermined criteria to become the optimal parameters for controlling said robot to perform said search pattern specified from said categorized assembly process; and
code configured to control said robot to perform said specified search pattern for fitting said fitting part into said receiving part to create said assembly that is said combination of said fitting and receiving parts using said verified optimal parameters for said categorized assembly process.

10. The system of claim 9 further comprising code configured to select said categorized assembly process from said predetermined types of assembly processes comprising cylindrical, radial and multi-stage insertion assembly processes.

11. The system of claim 9 further comprising code configured to assemble said specified search pattern from a plurality of search patterns with a transition state between each of said plurality of patterns and said parameters specified for said categorized assembly process comprises a set of parameters related to said search pattern transitions and another set of parameters related to the performance of said categorized assembly process.

12. The system of claim 10 wherein said multi-stage insertion assembly process is a combination of one or more cylindrical assembly processes and one or more radial assembly processes.

13. The system of claim 10 wherein in said cylindrical assembly process said fitting part is cylindrical and said receiving part is a smooth bore.

14. The system of claim 10 wherein said radial assembly process includes assembly applications with a toothed, splined or gear mesh.

15. The system of claim 9 wherein said fitting part and said receiving part each have a predetermined structure and said method further comprises categorizing said assembly process based on said fitting part predetermined structure and said receiving part predetermined structure.

16. The system of claim 9 wherein said assembly process for said robot to fit said fitting part into said receiving part is one or more of said plurality of predetermined types of said assembly processes and said method further comprises categorizing based on said fitting part predetermined structure and said receiving part predetermined structure which of said one or more of said plurality of assembly processes are to be used by said robot to fit said fitting part into said receiving part.

17. A system for assembling components comprising:
an industrial robot for assembling said components;
a computing device in communication with said robot, said computing device having therein program code usable by said computing device for optimizing the parameters of controlling a robot to fit a fitting part into a receiving part, said code comprising:
code configured to categorize based on a characteristic of said fitting part and said receiving part other than a size of said fitting part and a size of said receiving part an assembly process for said robot to fit said fitting part into said receiving part as one of a plurality of predetermined types of said assembly processes;
code configured to specify from said categorized assembly process a search pattern for fitting said fitting part into said receiving part and parameters for said categorized assembly process;
code configured to obtain by using a predetermined technique a set of optimal parameters for said categorized assembly process;
code configured to verify that said set of optimal parameters meets a predetermined criteria to become the optimal parameters for controlling said robot to perform said search pattern specified from said categorized assembly process; and
code configured to control said robot to perform said specified search pattern using said verified optimal parameters for said categorized assembly process to create an assembly that is a combination of said fitting and receiving parts.

18. The system of claim 17 wherein said fitting part and said receiving part each have a predetermined structure and said code further comprises code configured to categorize said assembly process based on said fitting part predetermined structure and said receiving part predetermined structure.

19. The system of claim 17 wherein said assembly process for said robot to fit said fitting part into said receiving part is one or more of said plurality of predetermined types of said assembly processes and said code further comprises code configured to categorize based on said fitting part predetermined structure and said receiving part predetermined structure which of said one or more of said plurality of assembly processes are to be used by said robot to fit said fitting part into said receiving part.

\* \* \* \* \*